No. 753,512. PATENTED MAR. 1, 1904.
W. H. MUZZY.
CASH REGISTER.
APPLICATION FILED AUG. 14, 1903.
NO MODEL. 7 SHEETS—SHEET 1.

Fig. 1.

Witnesses
W. McCarthy
John J. Ungváry.

Inventor
H. H. Muzzy

No. 753,512. PATENTED MAR. 1, 1904.
W. H. MUZZY.
CASH REGISTER.
APPLICATION FILED AUG. 14, 1903.
NO MODEL. 7 SHEETS—SHEET 2.

Witnesses
Inventor

No. 753,512. PATENTED MAR. 1, 1904.
W. H. MUZZY.
CASH REGISTER.
APPLICATION FILED AUG. 14, 1903.
NO MODEL. 7 SHEETS—SHEET 6.

Witnesses
W. McCarthy
John J. Ungváry

Inventor
H. Muzzy

No. 753,512.　　　　　　　　　　　　　　　Patented March 1, 1904.

UNITED STATES PATENT OFFICE.

WILLIAM H. MUZZY, OF DAYTON, OHIO, ASSIGNOR TO NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 753,512, dated March 1, 1904.

Application filed August 14, 1903. Serial No. 169,496. (No model.)

*To all whom it may concern:*

Be it known that I, WILLIAM H. MUZZY, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash-registers, and has more particular relation to improvements in the type of machine patented to Henry S. Hallwood, No. 704,795, dated July 15, 1902.

One of the objects of the invention is to provide the type of machine shown with improved independent cash-receptacles for the several clerks.

A further object of the invention is to provide an improved cash-receptacle divided into compartments having individual covers.

Other objects of the invention will become apparent from the following description and the appended drawings.

The invention consists, primarily, of certain novel constructions, combinations, and arrangements of parts, all of which will be hereinafter more particularly set forth and claimed.

In the accompanying drawings, forming part of this specification, Fig. 2ᵃ represents a detail side elevation of one of the locking elements of the combination-lock. Fig. 3 represents an enlarged detail perspective view of the cash-drawer removed from the casing, showing one of the compartments open. Fig. 4ᵃ represents a detail side elevation of the operating-gearing for the platen-cam.

As many of the parts shown in the present drawings are old and well known in the art and are fully shown and described in the aforesaid patent, I will refer to said patent for such detail descriptions of the parts as are not here given. Described in general terms, however, the machine of the type herein shown may be said to comprise a series of registering-wheels 1, mounted upon a central shaft 2 and formed about their peripheries with groups of numerals from "1" to "9." These wheels 1 are arranged to be operated by a series of pawls 3, carried by pivoted levers 4, which are also loosely mounted upon the aforesaid shaft 2. These levers 4 are in turn operated by a series of nested or auxiliary yokes 5. Each of these yokes carries a step-segment 6, which coöperates with the ends of the shanks of the keys 7, and thus arrests the auxiliary yokes in positions corresponding to the values of the keys depressed. After the auxiliary yokes have been set in the manner above described they are returned to their upper normal positions by a main actuating-lever 5ᵃ, which is journaled upon the shaft 2 and extends rearwardly and downwardly.

In the type of machine disclosed in the aforesaid patent the lever 5ᵃ is operated by a cash-drawer which forms a common receptacle for the cash of all of the different clerks operating the machine. In the present instance, however, I have divided the cash-drawer into two independent groups of compartments 10 and 11, which are allotted to independent clerks, so that they may keep their cash altogether separate. These two compartments are covered by independent sliding covers 12 and 13, which are mounted in suitable guiding-grooves formed in the side and middle rail 14 of the cash-drawer. Each of the covers is normally locked in position over its respective compartment by a series of spring-pressed locking-plungers 15, mounted in the front wall of the drawer and normally forced upward into sockets 16, formed in the under side of the respective slides.

Besides the plungers 15, which are normally spring-pressed upward, I also provide a number of plungers 17 for each slide which are normally spring-pressed downward, so that their lower ends, which are are provided with operating-buttons 18, lie approximately flush with the bottom of the cash-drawer.

The plungers 15 are operated and drawn downward by levers 19, pivotally connected thereto and also to pendent links 20, provided with operating-heads 21, which extend into positions similar to those occupied by the heads 18. By this means I provide a combination-lock for securing the respective lids over their compartments. Unless the operator knows just which buttons control the plungers 15 he will not be able to unlock the particular lid, as any pressure on any upward one of the heads 18 will lock its particular lid to the drawer, and any failure to press upward upon the heads 21 will leave the plungers 15 connected thereto in engagement with the walls of the recesses 16 in its respective lid.

Figures 2, 2A:
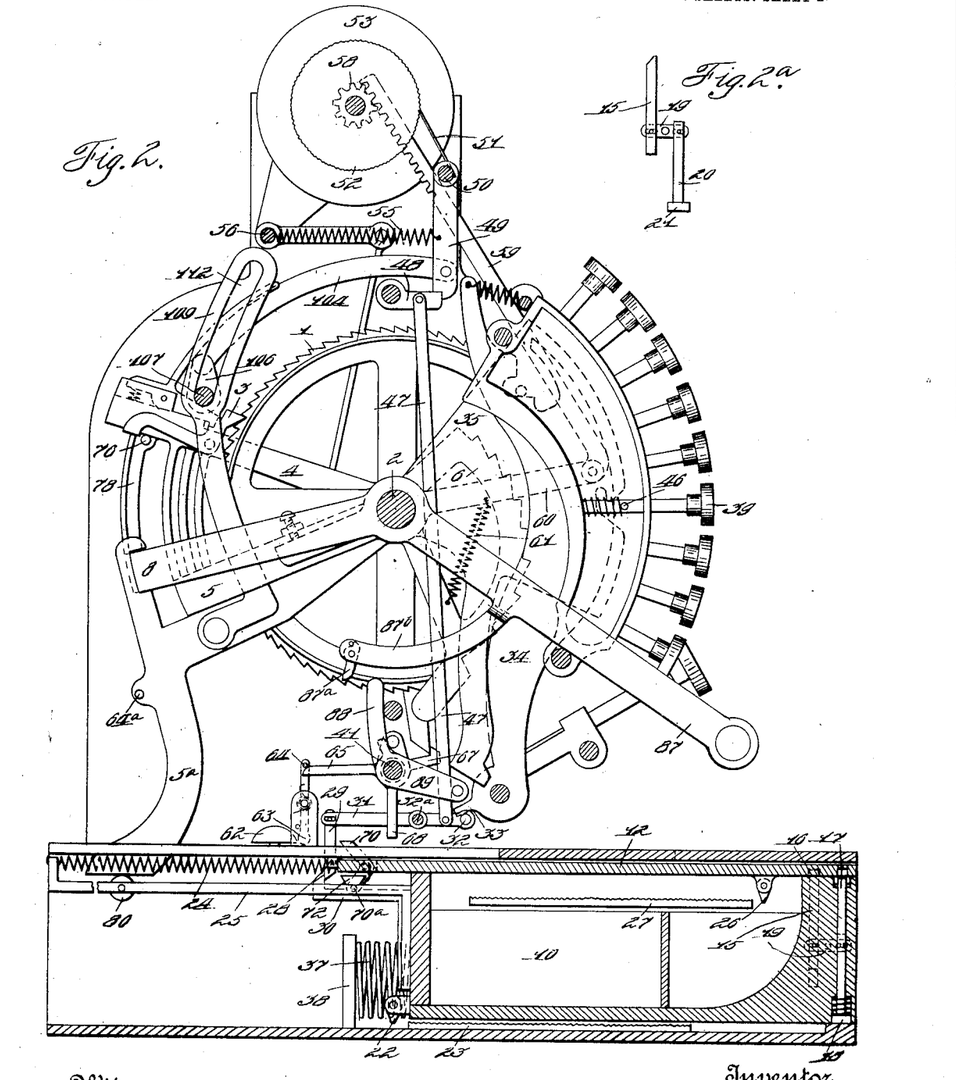
Fig. 2 represents a vertical transverse section through the same on the line 2 2 of Fig. 1.

It will be observed that all of the heads 18 and 21 are located to the rear of the front edge of the drawer and flush with the under side of the same, and therefore when the cash-drawer is closed they are not accessible, and it is only after the drawer has been opened that it is possible to release one of the slides 12 or 13 by forcing the heads 21 upward. The cash-drawer 9 is provided with a pendent full-stroke pawl 22, which coöperates with a suitable stationary ratchet-plate 23 to compel full opening and closing movements of said cash-drawer. After either one of the slides 12 or 13 has been released as before described it is automatically opened by a coil-spring 24, connected to said slide and to a bracket 25, secured to the rear of the cash-drawer. These springs, as shown in Fig. 2, are under tension when the slides are closed. When the locking-plungers are manipulated, however, and a slide released, the same is drawn rearward by its spring, thus exposing the compartment to which the particular slide belongs. In order to prevent any partial opening movement of the slides, each of the same is provided with a pendent full-stroke pawl 26, which coöperates with a stationary ratchet-plate 27, mounted on the cash-drawer. A slide must thus be fully opened before it can be returned toward its normal position by the closing of the cash-drawer. If it is not so opened and an attempt is made to manipulate the machine by holding back a slide, the drawer cannot be subsequently closed, as the pawl 26 will still engage the rack 27 and both the drawer and the slide will be arrested when the slide comes in contact with its return-stop 28, pendent from the main frame. When the slide is permitted to open, however, to its full extent, the action of the pawl 26 is reversed in a manner well known in the art, and the cover upon being arrested by its stop 28 does not arrest the cash-drawer, but permits the same to continue its inward movement until the parts become again latched together by the plungers 15 springing into the recesses 16.

Figure 8:
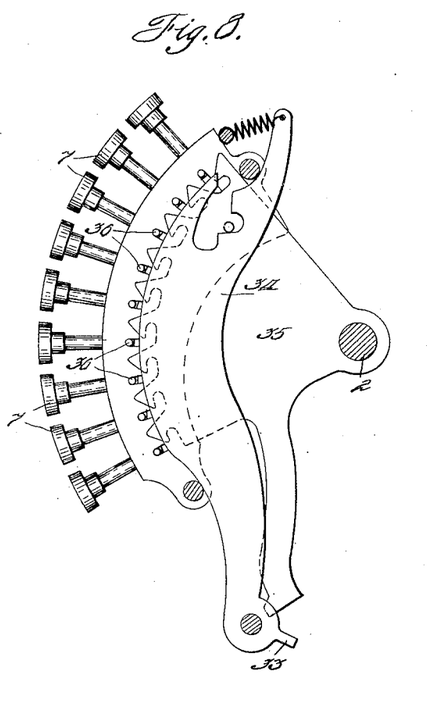
Fig. 8 represents a detail side elevation of one of the key-banks, showing the key-detents and detent-tripping segments.

The cash-drawer is normally held in the casing by a latch-plunger 29, suitably mounted in the main frame and engaging a latching-bracket 30, secured to the rear of the drawer. The plunger 29 is pivotally connected to a lever 31. This lever 31 is provided at its forward end with a transverse rod 32, which projects under a series of arms 33, secured to a number of pivoted segments 34, which normally act to latch the key-detents 35 in their elevated positions, as shown in Fig. 8. The lever 31 supports the rod 32 at one end only, the opposite end of said rod being supported by an arm $31^a$, which is pivoted upon the shaft $32^a$, upon which the lever 31 is pivoted. The segments 34 are arranged to be operated by pins 36, mounted on the shanks of the amount-keys. By this construction when any amount-key is operated one of the segments 34 is forced rearward, whereby its arm 33 will engage the rod 32 and rock the lever 31 to release the cash-drawer. When the cash-drawer is so released, it is projected from the casing by a suitable coil-spring 37, interposed between the rear wall of the drawer and a wall 38 projecting upward from the base of the machine. As the amount-keys remain latched in their inner positions, the latch-plunger 30 of the cash-drawer will remain elevated until the machine has been operated to release the amount-keys. The result of this construction is that the cash-drawer cannot be closed and relatched after being opened until the machine has been first operated to release the amount-keys.

Adjacent to the amount-keys I provide a special release-key 39, which may be termed a "No-sale" key. The operation of this key releases the cash-drawer in the manner above described.

The shank of the key 39 is provided with a pin 46, which when said key is depressed contacts with one of the segments 34 and rocks the lever 31 to release the cash-drawer. From this construction it results that when it is desired to operate the machine without registering any amount it is simply necessary to press this key 39, which will release the cash-drawer.

It is also desirable when any one of the amount-keys or the special key 39 is operated to destroy the previous indication, and to accomplish this result I connect a vertical link-rod 47 to the lever 31 at its lower end and at its upper end secure the same to a pivoted latch 48, which normally engages a pendent arm 49, connected to a rock-shaft 50, to hold a series of spring-pawls 51, mounted on said shaft, in engagement with ratchet-wheels 52, secured to the respective indicators 53 and 54. A coil-spring 55 connects the arm 49 to a transverse rod 56, so that when the latch-pawl 48 is drawn downward the arm 49 will be released, and the spring 55 will thereby draw said arm to the rear, thus rocking the shaft 50 and disengaging all of the pawls 51 from the rotary indicators. The shaft 50 is again rocked against the tension of the spring 55 to relatch the indicators in their set positions by devices hereinafter more fully described.

Each of the indicators 53 is provided with a pinion 58, which meshes with rack-teeth formed upon a rack-bar 59. This rack-bar is connected at its lower end to a pivoted lever 60, which coöperates with one of the auxiliary yokes, whereby the indicator is positioned substantially in the same manner as set forth in the aforesaid patent. When the pawls 51 are disengaged from the wheels 52, the rack-bars 59 are free to descend under impulses imparted to them by coil-springs 61, which connect them to the step-frame 6.

The devices here shown and described for dividing a drawer into a number of compartments, permitting the drawer to open and then releasing covers pertaining to the several compartments, said covers being automatically opened when released, are somewhat similar to those shown in the patent to Clark and Jones, No. 709,870, dated September 30, 1902. In said patent to Clark and Jones, however, it is possible for any clerk to open the cash-receptacle of any other clerk without detection, and it therefore becomes absolutely essential to provide some means whereby when any one of the compartments is uncovered some signal, alarm, indication, or account be made which will prevent such fraudulent manipulation. Such devices are provided in the present invention in the shape of distinguishing-bells for the different compartments, independent counters for the several compartments, and special indicating and printing devices for said compartments. Upon the opening of either one of the lids 12 or 13 a distinguishing-alarm is sounded. This alarm is preferably in the form of a bell 62, suitably mounted on the main frame and arranged to be sounded by a spring-actuated bell-hammer 63. This hammer is provided at its upper end with a laterally-projecting pin 64, which normally rests against an arm 65, forming part of a pivoted lever 66, which is mounted upon a sleeve 66$^a$, journaled on the transverse shaft 41. The sleeve 66$^a$ is provided with a hook-arm 67. The lever 66 is also formed with a pendent arm 68. When the arm 68 is moved rearward, the arm 65, which engages the pin 64, forces the same rearward until the arm finally passes the pin and allows the hammer 63 to spring back and sound the alarm. When the lever 66 has been operated as above described, it becomes latched in this position by the pin 64 passing under the arm 65, which then occupies an approximately horizontal position. The lever 63 is not operated to release the lever 66 until the machine is operated, and there is therefore no danger of the operated lever 66 being manipulated to relatch the parts which it unlatches until after such parts have been given their proper movements. The device for operating the levers 63 to release the latch-levers 66 comprises laterally-projecting pins 64$^a$, secured to the main operating-lever 5$^a$, which descends upon each operation of the machine and which are so located as to engage the levers 63 below their pivot-points and rock the pin 64 from under the arm 65 just as said main operating-lever reaches its lowermost position.

Figure 5:
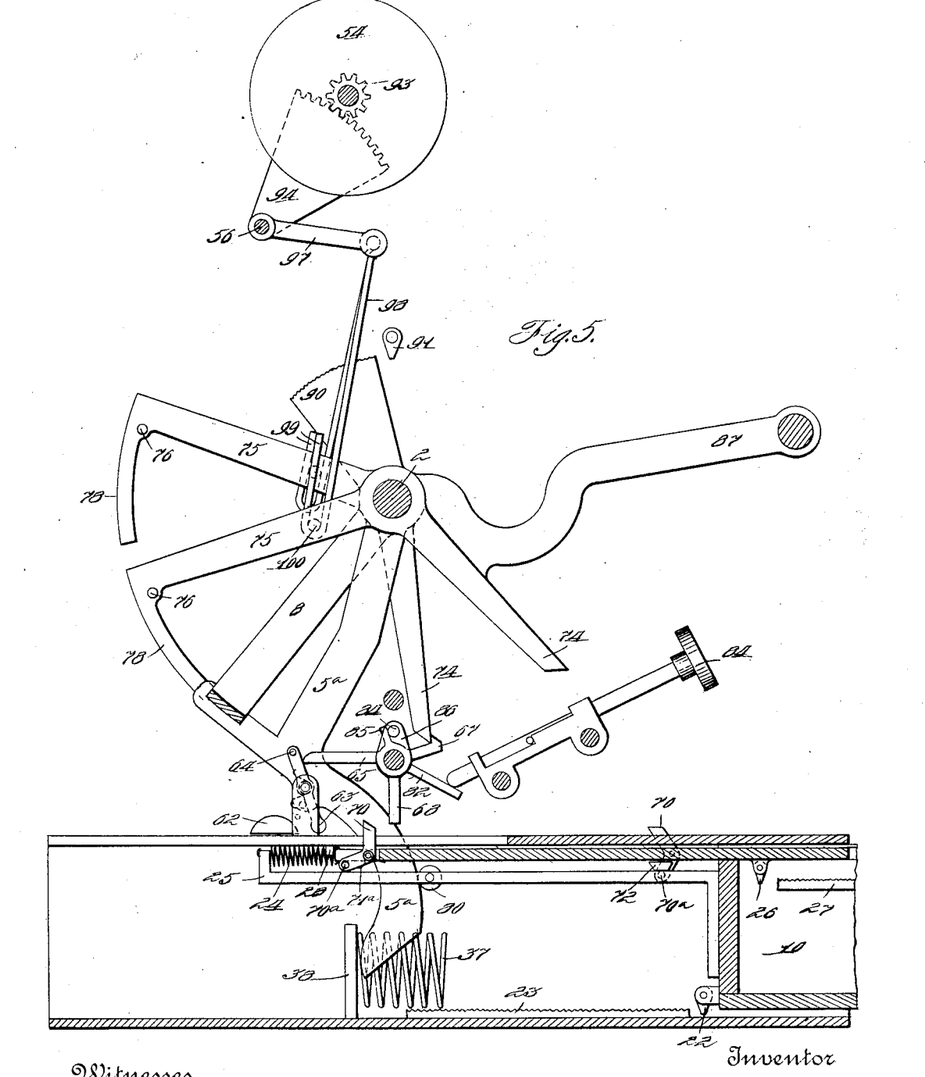
Fig. 5 represents a side elevation, partly in section, of the controlling devices for the independent counters and the special indicator.

Each of the slides 12 and 13 is provided with a pivoted angular pawl 70. Each of these pawls is provided with a laterally-projecting pin 70$^a$ and is normally held in the position shown in Fig. 2 and out of the path of its respective arm 68 by a beveled lug 72, mounted upon the bracket 25. When the cash-drawer passes forward, all of the above parts retain the positions shown in Fig. 2; but when one of the slides is released and moves rearwardly independent of the drawer, as shown in Fig. 5, its particular pawl 70 passes free of its lug 72 and is forced into a vertical position by a coil-spring 71$^a$, which is wound about the pivot of the pawl and engages with its opposite ends against the pawl and the slide. The pawl is arrested in this movement by its pin 70$^a$ striking the under side of its slide. As the slide now continues its movement the vertical portion of the pawl 70 engages the lower end of its respective arm 68, and thus rocks said arm and then passes free of the same, the pawl still remaining in its vertical position.

Figure 6:
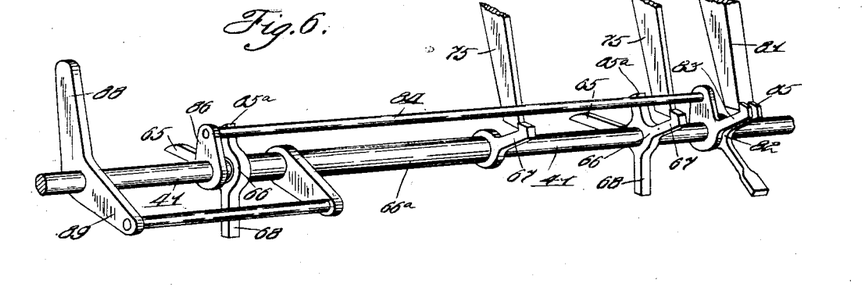
Fig. 6 represents a detail perspective view of the latch devices for the different counters and for the main operating element.

When the left-hand slide 12 is allowed to pass rearward, as above described, it rocks its respective lever 66, and the lever is held in this rocked position by the arm 65 passing above the pin 64 in the manner above described. By reference to Fig. 6 it will be seen that the lever 66, pertaining to the slide 13, is journaled upon the shaft 41 and directly carries its hook 67, the interposed sleeve 66$^a$ being omitted in this instance. In the aforesaid patent to Hallwood only one counting mechanism is shown and described; but in the present drawings I have shown two counters, one for each of the clerks to which the different compartments of the drawer belong. These counters are arranged in a manner well known in the art and substantially as shown in the patent to John H. McCormick, No. 570,141, dated Ocober 27, 1896.

Bell-crank levers 75, one adjacent to each counter, are journaled upon the shaft 2 and are provided with downwardly-extending arms 74 and at their rear ends with laterally-projecting rods 76, which normally support the levers 4 of the particular counter to which a certain bell-crank may belong. (See Figs. 2 and 5.) When the parts are in the position shown in Fig. 2, the levers 75 are locked by the hooks 67, so that should the machine be operated in such condition no addition will take place, as neither of the groups of operating-levers 4 will be allowed to drop. This construction is substantially the same as that described in the above-mentioned patent. When one of the levers 66 is rocked, however, by the opening of its respective slide, as heretofore described, it is latched in this rocked position, and its particular lever 75 is thus left free to rock upon its fulcrum when it is otherwise released. Both of the levers 75 are supported, however, in their normal positions by angular arms 78, resting to the main operating-yoke 8, which is journaled upon the shaft 2 and moves with the main operating-lever $5^a$. The lower end of the lever $5^a$ rests upon an antifriction-roller 80, journaled between the brackets 25, secured to the rear wall of the cash-drawer, so that when the cash-drawer opens the lever $5^a$ will be free to drop, and when the cash-drawer is closed the lever will again be forced back into its normal position.

The peculiar construction of the pawls 70 and the beveled projection 72 is necessary in order to prevent the operation of any lever 66 except that which should be operated by the independent rearward movement of either of the slides 12 or 13. None of the pawls 70 moves into a position to operate its respective lever 66 as long as its particular slide remains in its normal position in relation to the cash-drawer. Also after either of the levers 75 has been released it remains released and cannot be relatched until the machine is first operated. When the cash-drawer is closed after a slide has been opened, the particular projection 72, pertaining to the opened slide, will engage the pin $70^a$ of its pivoted pawl 70 and again rock the pawl in its inoperative position.

The main operating-yoke 8 is provided with a pendent arm 81, similar to the arm 75, but of a greater width. (See Fig. 6.) This arm is latched in its normal position by two latches 82 and 83. The latch 82 is of bell-crank formation and is loosely mounted on the shaft 41, so that one of its arms will project in proximity to the lower end of a special release-key 84, suitably mounted in the main frame. When this key is depressed, the hook end 85 of the latch 82 will be moved out of the path of the arm 81, and thus release the main yoke as far as this particular latch is concerned. The main yoke, however, is otherwise locked by the latch 83, which must be previously operated in order to permit the total release of said main yoke. The latch 83 is substantially of the same construction as the latch 82. This latch is pivoted upon the shaft 41 and forms a support for one end of a trip-rod 84, which extends in front of the lugs $85^a$, formed on the respective lever 66. The opposite end of the rod 84 is supported by an arm 86, journaled on the shaft 41.

It will be seen from the above description that the arm 81 is first released by the rocking of either one of the levers 66 and is finally released by the depression of the key 84. Should a clerk attempt to open a drawer after operating the amount-keys and then close the same without opening either one of the slides 12 or 13 and then operate the release-key 84 to secure the desired indication, the second lock 83 would still remain in position to prevent the tripping of the main yoke and the movement of the parts to the positions determined by the amount-keys operated. A clerk is thus compelled when he opens a cash-drawer to open one or the other of the lids 12 or 13, and thus release the proper counter and special indicator before he can register or indicate any amount.

Figures 4, 4A:
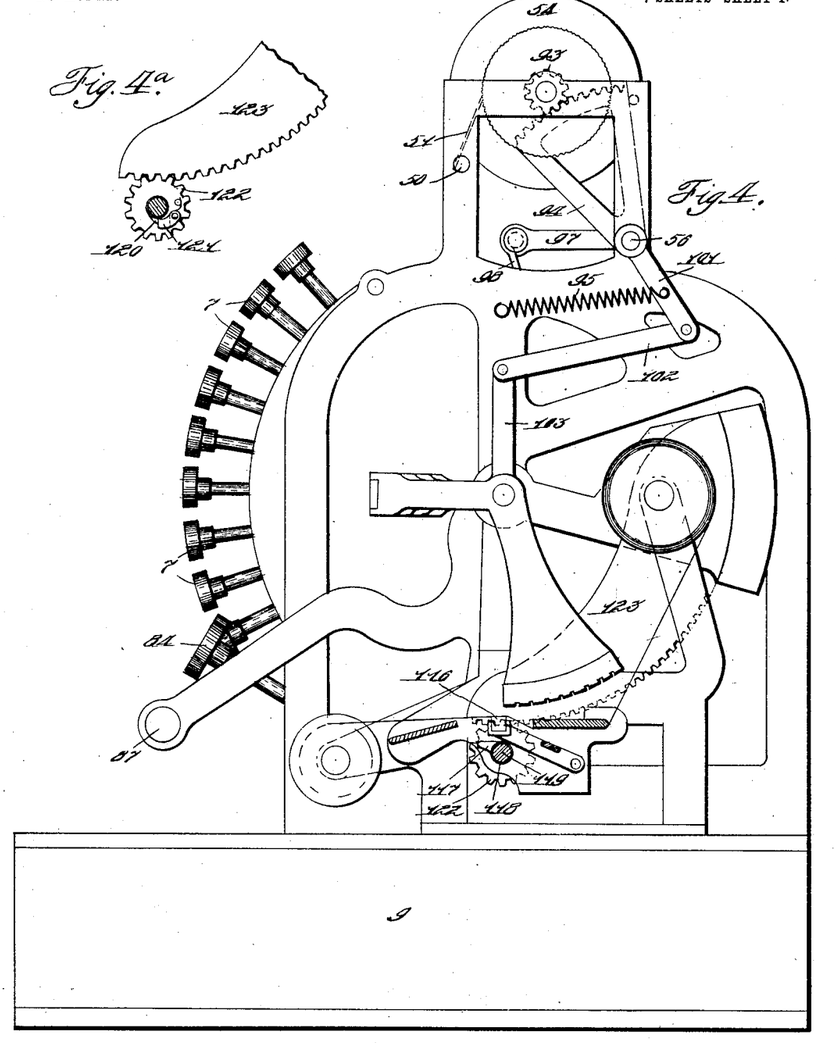
Fig. 4 represents a side elevation of the machine, taken from the end to which the printer is attached.

As it is sometimes desirable to return the operated parts of the machine to their normal positions by means other than the cash-drawer, I provide a main operating yoke or lever 87. This yoke is connected directly to the yoke 8 and is arranged to play across the front of the machine in front of the regular key-banks. When the main yoke 8 descends, the yoke 87 is elevated, and to return the parts to their normal positions it is simply necessary to again depress the yoke 87. As the yoke reaches its final lower position a wiper-pawl $87^a$, mounted upon an extension $87^b$ of said yoke, engages and rocks an arm 88, which arm is connected to a pivoted frame 89, which engages and elevates the key-detents to release the keys, substantially as described in the aforesaid patent to Hallwood. The lever 87 is provided with a segmental rack 90, which coöperates with a pendent pawl 91 to compel complete movements of the lever 87 and yoke 8 in both directions. The levers 75, which control the respective independent counters, are utilized to set the special indicator 54 and a special type-carrier 92, as shown in Figs. 4 and 5. To effect this result, the said special indicator is provided with a pinion 93, which is engaged by a pivoted rack-segment 94. This segment is held in its normal position by a coil-spring 95, which connects it to the main frame. The segment is mounted upon the shaft 56, which carries horizontal arms 97. Each of these arms is provided with a pendent link 98, formed with a hook 99 at its lower end. Pins 100, mounted on the respective levers 75, project through the hooks 99, and as these hooks are of different lengths the dropping of any particular lever 75 will rock the segment 94 to a greater or less extent, and thus set the indicator accordingly. The shaft 56 is also provided with an arm 101, connected by a link 102 to an arm 103, formed on the special type-carrier 92.

Figure 1:
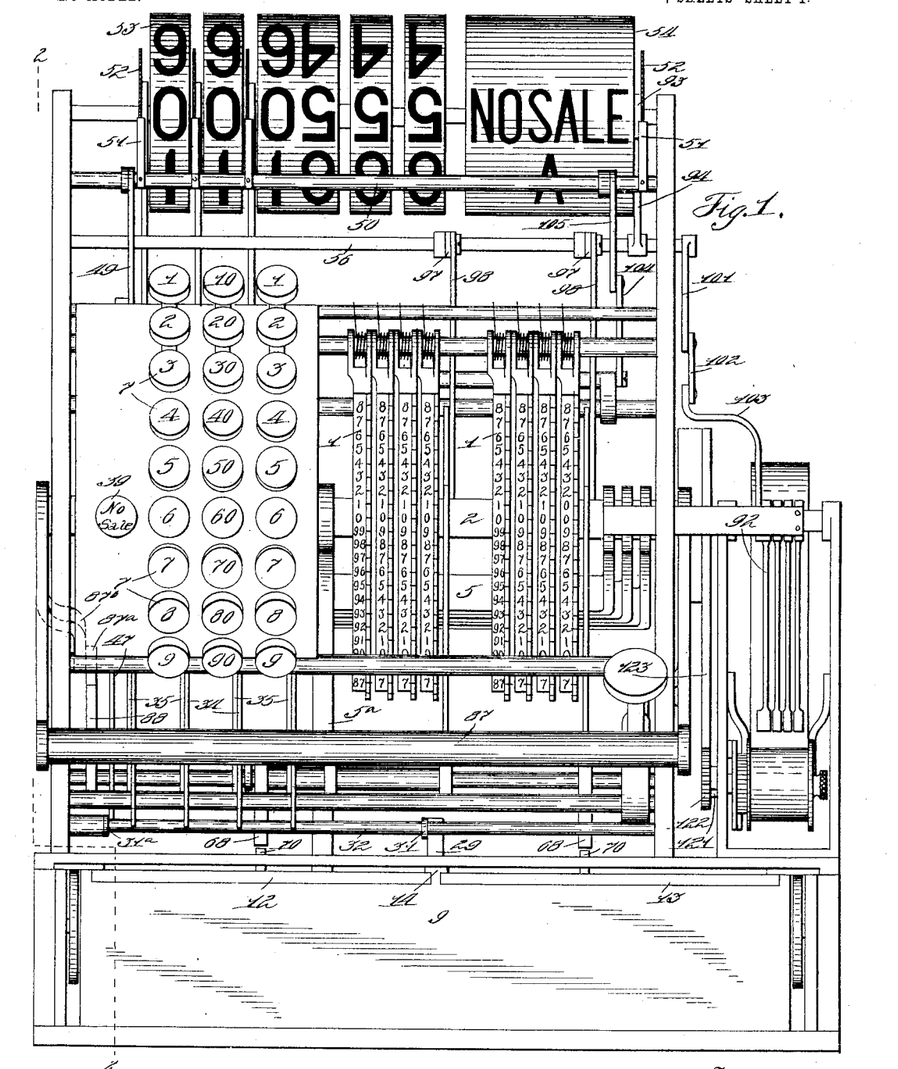
Figure 1 represents a front elevation of a machine of the class mentioned with my improvements applied thereto.
Figure 7:
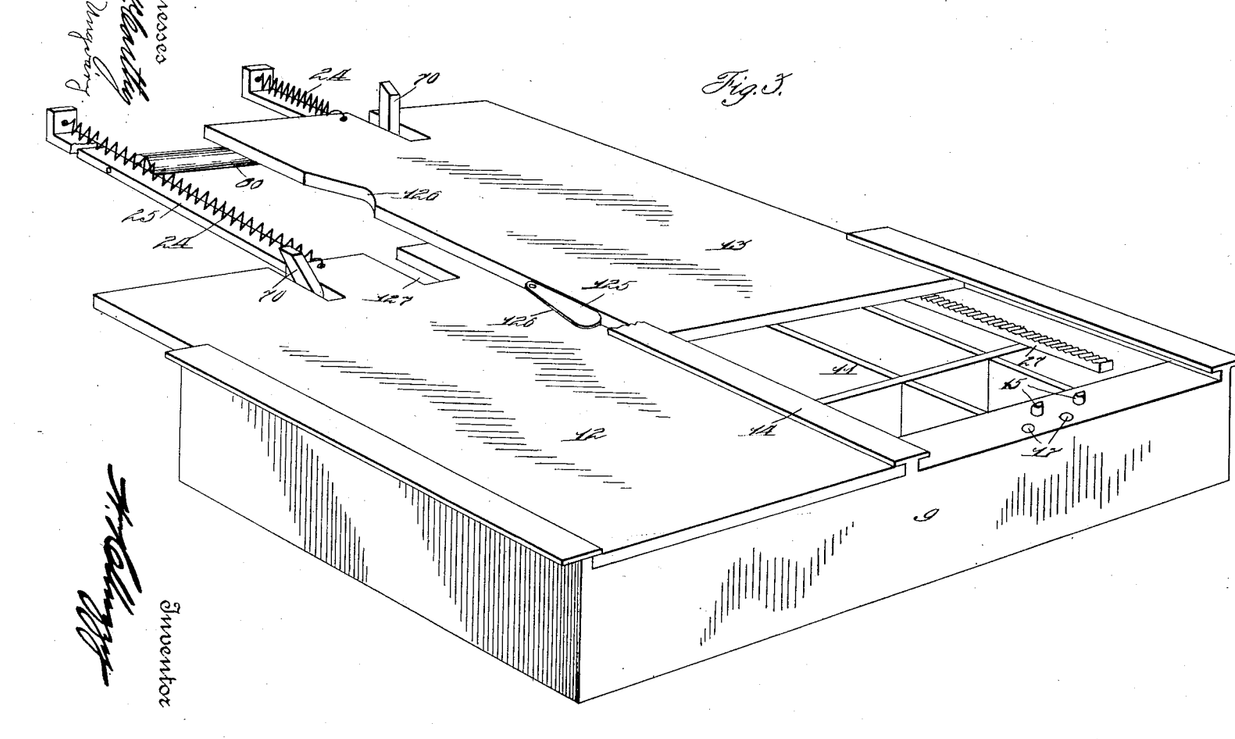
Fig. 7 represents a detail perspective view of the devices for operating the indicator-latching pawls.

As before stated, the indicator-pawls 51 after being disengaged from the indicator ratchet-wheels are subsequently engaged with the same after the indicators are set to hold the indicators in their set positions while the operating parts return to their normal positions. The devices for rocking the shaft 50 to effect this result are shown in Fig. 7. These devices comprise a link 104, pivotally connected to the lower end of an arm 105, (see Fig. 1,) mounted on a transverse shaft 107. The rock-frame 106, which disengages the locking devices from the operating-pawls, is provided at one end with a laterally-projecting stud 108. This stud is arranged to form a stop for a pivoted operating-link 109, which is normally forced laterally against said stud by a coil-spring 110, mounted upon the shaft 107 intermediate the link 109 and a supporting-arm 111. The lower end of the link 109 is pivotally connected to the lever 5ª and at its upper portion is formed with a curved slot 112, through which the shaft 107 passes. The upper end of the link 109 is formed with an inclined shoulder 113 for operating against the stud 108. When the lever descends upon the opening of the cash-drawer, a cam-face 114, formed on the link 109, engages the stud 108, and the link is thus forced laterally against the tension of its spring 110. When the link has descended a sufficient distance, it is released by the stud 108, passing above the inclined shoulder 113. When the link is so released, it automatically assumes its normal position, with the shoulder 113 under the stud 108. When the link 104 is now elevated, the camming action of the shoulder 113 will force the stud 108 forward until it finally passes into the slot 112. This operation will rock the frame 106, and the shaft will remain rocked during the upward movement of the link. When the link reaches the upper end of its movement, the stud 108 passes free of the wall of the slot 112 and assumes its normal position (shown in Fig. 8) ready for the next operation of the machine. Just prior to this final movement, however, the keys are released and the lever 31 allowed to assume its normal position, which will release the latch 48 and allow the same to engage the arm 49 to hold the pawls 51 in engagement with the ratchet-wheels 52. The frame 106 is forced forward when released by the final movement of the link by a coil-spring 115, mounted on the shaft 107 and connected at its opposite ends to the frame and said shaft.

For the purpose of operating the pivoted platen 116 a cam 117, mounted upon a sleeve 118, is provided. This sleeve is journaled upon a shaft 119, as plainly shown in Figs. 4 and 4ª, and is provided with a nose 120, with which a spring-pressed pawl 121 contacts to rotate the sleeve, and thereby cause the cam 117 to force the platen upward and make an impression on the detail-strip. The pawl 121 is carried by a pinion 122, which is journaled on the shaft 119 and meshes with a segmental rack 123, fast to the main yoke.

It will be seen from the above that the sleeve 118 is only rotated in one direction upon the upward movement of the segment 123. Upon the reverse movement of the segment the pawl 121 rides over the sleeve 118 without operating it, as will be readily understood.

I do not care to limit my invention to a drawer for two compartments only, as this particular form has been shown merely to illustrate the invention. Any desired number of compartments with independent covers could be constructed and operated in substantially the same manner as set forth above.

In order to prevent the simultaneous opening of the two lids, any suitable form of interfering device may be placed between them. I prefer to employ, however, such a device as shown in Fig. 3, which comprises a pivoted wedge-shaped tumbler 125, secured to the cash-drawer and located in proximity to notches 126, formed in the respective slides. By this means when one slide is opened the tumbler is forced into the notch of the companion slide, thereby locking the same. If an attempt should be made to open both of the slides at the same time, neither could be forced rearward, as the walls of the recesses 126 would jam against the tumbler.

In order to permit the full movement of the main operating-lever 5ª, I form the rear of the slide 12 with an aperture 127, as plainly shown in Fig. 3.

From the foregoing description it will be seen that when any clerk operates the machine he first depresses any one of the amount-keys or the "No-sale" key, which operation opens the cash-drawer. All of the operating mechanism of the machine, however, is normally locked and remains so even after the cash-drawer is opened. The opening of the drawer is therefore altogether independent of the operation of the machine. The release of the drawer, however, is accompanied by the release of the indicators, which are all automatically returned to their zero-indicating positions. Until the cash-drawer is opened none of the combination-locks for the respective slides are accessible, and it is thus necessary for a clerk to destroy any previous indication before he can obtain access to either of the combination-locks. After the cash-drawer is opened the clerk operates his proper lock, which permits the slide covering his particular compartment to spring rearward, and thus expose the compartment. The rearward movement of the slide sounds a particular alarm, releases the counter devices pertaining to the slide operated, and sets the parts for properly indicating and printing characters pertaining to the clerk who is operating the machine. The machine, however, still remains locked and is only released and allowed to operate when the release-key is actuated to move the locking-lever 82. When the release-key is so moved, the main operating-yoke is released and drops until the operating-lever 5ª engages the roller 80. Any well-known cushioning device may be provided to prevent any shock upon the dropping of the main operating-lever and the parts supported thereby. The main operating-lever may now be returned either by the cash-drawer or by the operating-lever 87, as desired. When the cash-drawer is closed, the slide which has been previously opened remains stationary and resting against its particular stop 28. As the cash-drawer reaches its inner closed position the plungers 15 again snap up into the recesses 16 and lock the slide to the cash-drawer.

It will of course be understood that I have simply shown a cash-drawer divided into two compartments merely for the sake of illustration. It is well within the scope of this invention to divide the cash-drawer into any desired number of compartments and provide these compartments with any suitable construction of sliding or pivoted covers. It will also be understood that the operating-lever 87, shown is only one form of operating-handle that might be applied to this type of machine. For instance, the main yoke 8 might be operated by a rotary crank-handle, if desired, with intermediate gearing; but such a construction is not specifically claimed in the present application.

I do not care to limit my invention to the peculiar arrangement of cash-drawer shown, as many known equivalents of the separate cash-receptacles shown may be employed without departing from the spirit of this invention.

The special indicator 54 normally stands in the position to indicate "No sale," so that should the cash-drawer be opened by the "No-sale" key the fact that no sale has been registered will be indicated to the customer. This indication will only be effective, however, at such times as when a clerk would attempt to deceive the customer into believing that a registration is taking place by simply operating the machine without pressing any amount-keys. Just as soon as either of the covers is opened the parts which are set to the "No-sale" indication are reset for an indication indicative of the clerk making the sale; but this latter change does not take place until the release-key 84 is operated, thus constituting an additional safeguard against the clerk failing to complete a transaction without having opened the cash-drawer. Should a clerk open the cash-drawer, then open his particular compartment, and then close the cash-drawer without operating the release-key, the indicators would all remain at zero and "No sale" would appear on the indicator. The machine if left in this condition, however, would leave the latch 67 of that particular clerk depressed, so that should another clerk come to the machine to operate it the addition would take place on the first clerk's counter also. The clerks being aware of this fact would never fail to operate the machine completely by depressing the release-key. When the release-key is depressed, the lever 5ª drops, and any hooks 67 that may have been depressed are returned to their normal locking positions.

When a clerk opens his particular compartment to make change, he releases the cash-drawer by the "No-sale" key. When he subsequently releases his slide, the special indicator 54 changes from a "No-sale" indication to an indication of the initial of the clerk. This, however, is equivalent to a "No-sale" indication, as the numerals printed and indicated are all zeros.

Having thus described my invention, what I claim as new, and desire to secure by Letters Patent, is—

1. In a cash-register, the combination with accounting devices, of a cash-receptacle divided into compartments, covers for said compartments, and means operated by the movements of the covers for controlling the accounting devices.

2. In a cash-register, the combination with indicating devices, of a cash-receptacle divided into compartments, covers for said compartments, and means operated by the movements of the covers for controlling the indicating devices.

3. In a cash-register, the combination with a printing mechanism, of a cash-receptacle divided into compartments, covers for said compartments, and means operated by the movements of the covers for controlling the printing mechanism.

4. In a cash-register, the combination with accounting devices, of a cash-drawer divided into compartments, covers for said compartments, and means operated by the movements of the covers for controlling the accounting devices.

5. In a cash-register, the combination with accounting devices, of a cash-drawer, divided into compartments, sliding covers for said compartments, and means operated by the movements of the covers for controlling the accounting devices.

6. In a cash-register, the combination with accounting devices, of a cash-drawer divided into compartments, automatically-operating covers for said compartments, and means operated by said covers for controlling the accounting devices.

7. In a cash-register, the combination with a printing mechanism, of a plurality of separate cash-receptacles each of which is provided with a movable member, and means operated by the movable members for selecting the printing mechanism.

8. In a cash-register, the combination with accounting devices, of a plurality of separate cash-receptacles each of which is provided with a movable member, and means operated by the movable members for selecting the accounting devices.

9. In a cash-register, the combination with a plurality of independent accounting devices, of a plurality of separate cash-receptacles having a plurality of movable members, and means operated by the movable members for selecting the corresponding accounting device for operation.

10. In a cash-register, the combination with a plurality of counters, of a plurality of cash-receptacles each of which is provided with a movable member, and means operated by the movable members for selecting the corresponding counter for operation.

11. In a cash-register, the combination with a plurality of counters, of a cash-drawer divided into compartments, covers for said compartments, and means operated by the covers for selecting the corresponding counter.

12. In a cash-register, the combination with an operating mechanism including an oscillatory member, of a cash-drawer divided into compartments and arranged to operate said member, independent covers for the different compartments, accounting devices, and means operated by the covers for controlling the accounting devices.

13. In a cash-register, the combination with an operating mechanism, of a counter, a cash-drawer for actuating the operating mechanism and divided into compartments, covers for said compartments, a lock for the operating mechanism, and means operated by the covers for actuating said lock.

14. In a cash-register, the combination with an operating mechanism, of a cash-drawer divided into compartments, covers for said compartments, a lock for the operating mechanism, and operating means intermediate the covers and said lock.

15. In a cash-register, the combination with an operating mechanism, of a lock for the same, a cash-drawer divided into compartments, sliding covers over said compartments, and means operated by the covers for actuating the lock.

16. In a cash-register, the combination with an operating mechanism, of two locks for the same, a series of separate cash-receptacles each of which has a movable member, means operated by the movable members for actuating one of said locks, and an independent means for actuating the remaining lock.

17. In a cash-register, the combination with an operating mechanism, of two locks for the same, a cash-drawer divided into compartments, covers for said compartments, means operated by the covers for actuating one of the locks, and independent means for actuating the remaining lock.

18. In a cash-register, the combination with an operating mechanism, of a cash-drawer divided into compartments, covers for said compartments, accounting devices, alarm devices, and means operated by the covers for controlling said accounting and alarm devices.

19. In a cash-register, the combination with a plurality of counters, of an indicating mechanism, a printing mechanism, a cash-drawer divided into compartments, covers for said compartments and mechanism operated by the covers for controlling the counters, the indicating devices, and the printing mechanism.

20. In a cash-register, the combination with a plurality of counters each of which comprises a series of counter-wheels and a series of operating-pawls, of pivoted levers for normally holding the pawls in inoperative positions, a cash-drawer divided into compartments, covers for said compartments, and means operated by the covers for releasing the holding-levers.

21. In a cash-register, the combination with a cash-drawer divided into compartments, of a series of sliding covers over said compartments, means for closing the covers as the drawer is closed, and full-stroke devices intermediate the covers and the drawer whereby the drawer cannot be closed until the covers are fully opened.

22. In a cash-register, the combination with a cash-drawer divided into compartments, of sliding covers for said compartments, means for automatically drawing the covers from over the compartments when released, and full-stroke devices intermediate the covers and the drawer whereby the drawer cannot be closed until the covers are fully opened.

23. In a cash-register, the combination with an operating mechanism including an oscillatory member, of a cash-drawer arranged to operate said member and divided into compartments, covers for said compartments, and means operated by the covers for releasing the oscillatory member.

24. In a cash-register, the combination with an operating mechanism including an oscillatory member, of a cash-drawer divided into compartments, covers for said compartments, a lock for the oscillatory member controlled by the covers, a second lock for said member, and means independent of the covers for operating the second lock.

25. In a cash-register, the combination with an operating mechanism including an oscillatory member, of an operating-handle connected to said member, a cash-drawer for operating said member and divided into compartments, covers for said compartments, and a lock for said member controlled by the covers.

26. In a cash-register, the combination with an operating mechanism including an oscillatory member, of an operating-handle connected to said member, a series of separate cash-receptacles having movable members, and a lock for the oscillatory member controlled by the movable members of the cash-receptacles.

27. In a cash-register, the combination with an operating mechanism including an oscillatory member, of an operating-handle connected to said member, a cash-drawer for operating said member and divided into compartments, covers for said compartments, and a lock for the oscillatory member controlled by said covers.

28. In a cash-register, the combination with an operating mechanism including an oscillatory member, of an operating-handle connected to said member, a cash-drawer divided into compartments and constructed to operate said member, sliding covers for the compartments, and a lock for the oscillatory member controlled by the sliding covers.

29. In a cash-register, the combination with a series of counting elements, of a series of operating-yokes, means for limiting the movements of the yokes, a main operating member for said yokes, a main yoke connected to said member and having its arms extended forward through the front of the machine, and an operating cross-bar connecting the forwardly-extending arms outside of the casing of the machine.

30. In a cash-register, the combination with a series of amount-keys, of an operating mechanism controlled thereby, a cash-drawer divided into compartments, a latch for the drawer arranged to be released by the amount-keys, covers for the drawer-compartments, and means operated by the covers for controlling the operating mechanism.

31. In a cash-register, the combination with an operating mechanism, of a cash-drawer divided into compartments, sliding covers for said compartments, springs for opening the covers when they are released, and means operated by the covers when so opened for controlling the operating mechanism.

32. In a cash-register, the combination with an operating mechanism, of a cash-drawer divided into compartments, movable covers for said compartments, springs for opening the covers when they are released, and means operated by the opening of the covers for controlling the operating mechanism.

33. In a cash-register, the combination with an operating mechanism, of a cash-drawer divided into compartments, sliding covers for the compartments, springs for opening the covers when they are released, means for closing the covers upon the closing of the cash-drawer, and means operated by the opening movement of the covers for controlling the operating mechanism.

34. In a cash-register, the combination with a common operating mechanism, of a plurality of counting devices, independent actuators for the counting devices, locks for the respective actuators, a cash-drawer divided into compartments, movable covers for said compartments, and means operated by the covers for actuating the locks.

35. In a cash-register, the combination with a cash-drawer, of a sliding cover over said drawer, means for closing the cover as the drawer is closed, and a full-stroke device intermediate the cover and the drawer whereby the drawer cannot be closed until the cover is fully opened.

36. In a cash-register, the combination with an operating mechanism, of a plurality of independent counters, a plurality of separate cash-receptacles each of which has a movable member, latching means for the several counters, and means for releasing a particular counter upon the opening of its corresponding cash-receptacle.

37. In a cash-register, the combination with an operating mechanism, of two locks for the same, a plurality of cash-receptacles having movable members, means for operating one of the locks upon the opening of any cash-receptacle, and an independent means for operating the remaining lock.

38. In a cash-register, the combination with an operating mechanism including an oscillatory member, of a cash-drawer divided into compartments and arranged to control said member, automatic sliding covers for the compartments, and means operated by the covers for governing the movements of the operating mechanism.

39. In a cash-register, the combination with an operating mechanism including an oscillatory member, of a cash-drawer divided into compartments and arranged to operate said member, sliding covers for the cash-drawer, springs for drawing the covers rearward when they are released, latches for the covers constructed to be operated after the cash-drawer is opened, and controlling devices for the operating mechanism actuated by the opening movement of the covers.

40. In a cash-register, the combination with an operating mechanism, of indicating, printing, and counting devices coöperating therewith, a cash-drawer divided into compartments, sliding covers for said compartments, means for releasing the covers after the cash-drawer is opened, and means actuated by the opening movement of the covers for controlling the operating mechanism.

41. In a cash-register, the combination with an operating mechanism, of a cash-drawer divided into compartments, sliding covers for said compartments, means for releasing the covers after the cash-drawer is opened, and devices actuated by the covers for controlling the operating mechanism.

42. In a cash-register, the combination with an operating mechanism including an oscillatory member, of a cash-drawer coöperating with said member and divided into compartments, sliding covers for said compartments, springs for drawing the covers open when released, locks for the covers arranged to be operated after the cash-drawer is opened, and a lock for the oscillatory member actuated by the automatic opening movement of any one of the covers.

43. In a cash-register, the combination with an operating mechanism, of a series of indicators arranged to be set thereby, latches for holding the indicators in their set positions while the operating mechanism returns to its normal position, a cash-drawer divided into compartments, a latch for the cash-drawer, keys for simultaneously releasing the indicators and the cash-drawer, covers for the compartments of the drawer, and means operated by the covers for controlling an indicator.

44. In a cash-register, the combination with an operating mechanism, of a cash-drawer divided into compartments, slides for covering said compartments, operating devices carried by the slides and brought into operative position when the relative positions of the drawer and slide are changed, and means actuated by said operating devices for controlling the operating mechanism.

45. In a cash-register, the combination with an operating mechanism, of a cash-drawer divided into compartments, covers for said compartments, operating devices brought into operative position when the relative positions of the covers and drawer are changed, and distinctive alarms controlled by the operating devices.

46. In a cash-register, the combination with an operating mechanism, of a cash-drawer divided into compartments, sliding covers for said compartments, operating devices mounted on said covers and normally held in inoperative positions by contact with the drawer, and alarm devices actuated by said operating devices when the same are moved to operative position by the opening of the cover.

47. In a cash-register, the combination with an operating mechanism, of a plurality of counters, a cash-drawer divided into compartments, covers for the compartments, latch devices operated by the covers for rendering any desired counter operative, and main latch devices operated by said first-mentioned latch devices for releasing the operating mechanism when any one of the counters is released.

48. In a cash-register, the combination with a cash-drawer divided into compartments, of sliding covers for said compartments, springs for opening the covers when they are released, a register-operating mechanism, means operated by the covers for controlling said mechanism, and devices for preventing the opening of more than one cover at a time.

49. In a cash-register, the combination with an operating mechanism including an oscillatory member, of a cash-drawer divided into compartments, sliding covers for the compartments, counting elements, latches for the counting elements, means operated by the covers for tripping the latches, devices for holding the latches in their tripped positions, and means carried by the oscillatory member for actuating said devices to allow the latches to assume their normal positions.

In testimony whereof I affix my signature in the presence of two witnesses.

WILLIAM H. MUZZY.

Witnesses:
W. McCarthy,
Wm. O. Henderson.